(No Model.) 2 Sheets—Sheet 1.

I. M. GREEN & J. P. BIRCH.
CONDUIT FOR ELECTRIC WIRES.

No. 284,413. Patented Sept. 4, 1883.

Witnesses:
Frank M. Brias
Joseph R. Steele

Inventor:
Imlah M. Green
John P. Birch (No Model.) 2 Sheets—Sheet 2.

I. M. GREEN & J. P. BIRCH.
CONDUIT FOR ELECTRIC WIRES.

No. 284,413. Patented Sept. 4, 1883.

Witnesses:
Frank McBride
Joseph N. Steele

Inventor:
Isaiah M. Green
John P. Birch

N. PETERS, Photo-Lithographer, Washington, D. C.

UNITED STATES PATENT OFFICE.

IMLAH M. GREEN AND JOHN P. BIRCH, OF PHILADELPHIA, PENNSYLVANIA.

CONDUIT FOR ELECTRIC WIRES.

SPECIFICATION forming part of Letters Patent No. 284,413, dated September 4, 1883.

Application filed August 10, 1882. (No model.)

*To all whom it may concern:*

Be it known that we, IMLAH M. GREEN and JOHN P. BIRCH, residing at Philadelphia, in the county of Philadelphia and State of Pennsylvania, have invented a new plan of fabricating or constructing conduits for housing or containing telegraphic and telephonic wires, electric-light cables, and other electric conductors, of which the following is a specification.

The conduit is made up of lengths or sections measuring three feet (more or less) in extent and any desirable diameter. These lengths are hollow or tubular, and are joined at their ends or edges, and when in position form one continuous vault or tube. Within this vault or tube are placed telegraphic and telephonic wires, electric-light cables, and other electric conductors.

Our invention relates to the plan herein described of fabricating the body of the conduit and the construction of the internal arrangement, by which means is secured a sure protection and perfect insulation of the wires.

Figure 1:
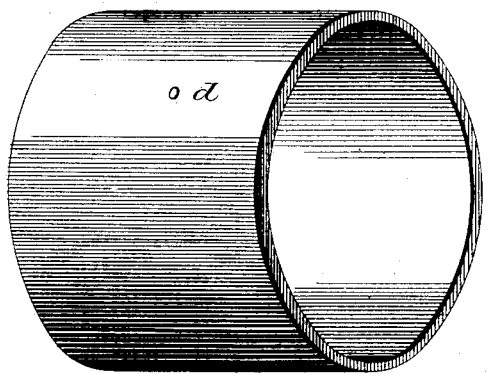
Figure 2:
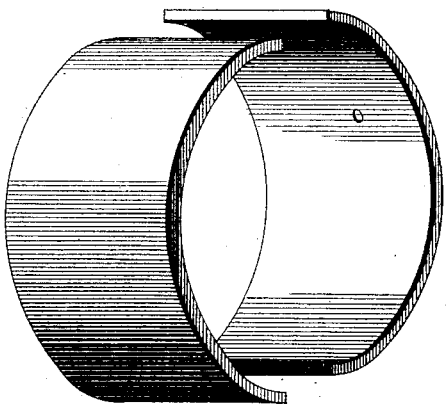
Figure 3:
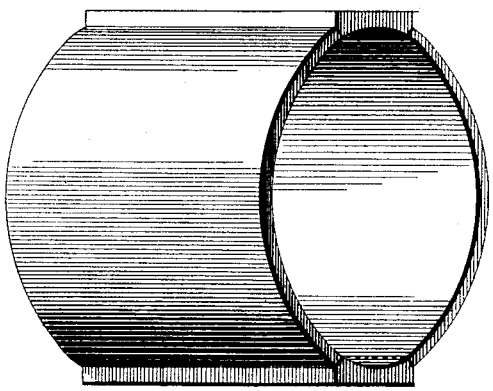
Figure 4:
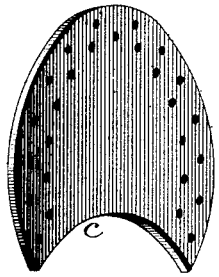
Figure 5:
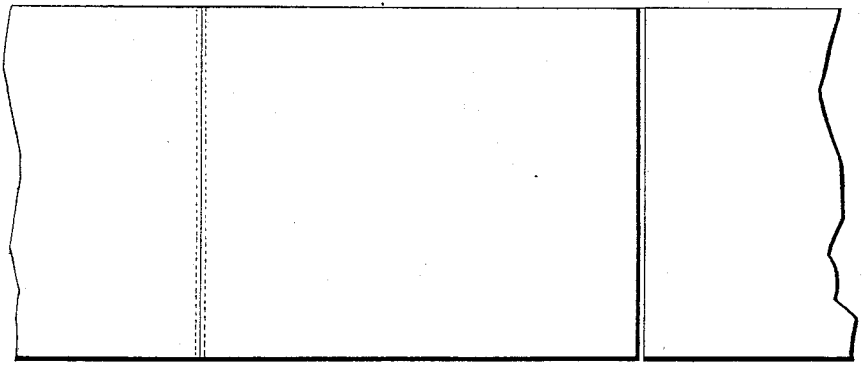
Figure 6:
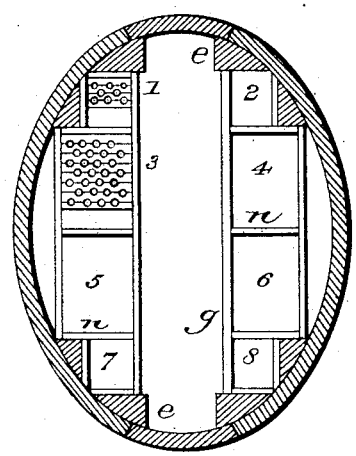
Figure 7:
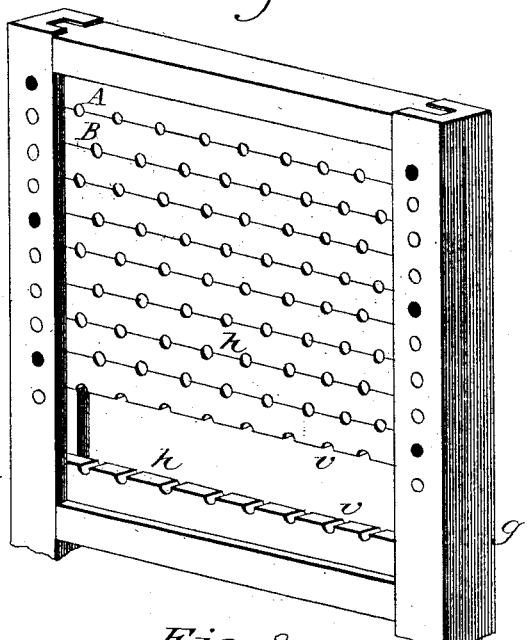
Figure 9:
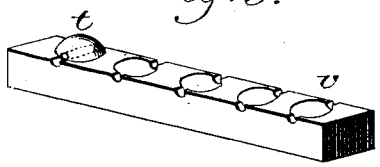
Figure 8:
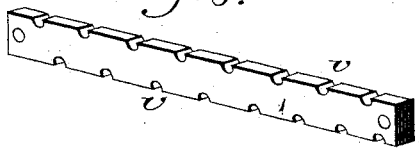
Figure 10:
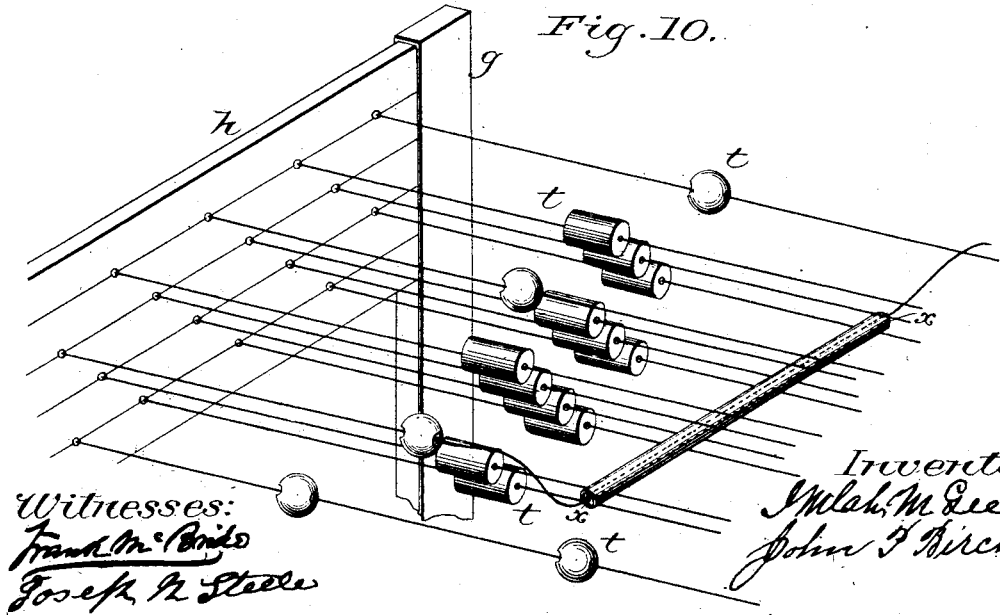

Figures 1, 2, and 3, Plate I, refer to the body of small conduits; Fig. 4, the form of septums for holding the wires in small conduits. Fig. 5 shows several sections of the conduit as placed for use. Fig. 6, Plate II, refers to the body of large conduits, and also the plan of arranging the wires in large conduits. Fig. 7 shows the arrangement of the wires on a larger scale; Figs. 8 and 9, the plan or device of the supporting-bar, and Fig. 10 the mode of insulating the wires.

Each length of the conduit may be molded in one entire piece, Fig. 1, or in two or more slabs or divisions of each length, Figs. 2, 3, and 6, and are so formed that when put together a transverse section may be circular, elliptical, or whatever shape is required. This conduit is manufactured from native asphaltum mixed with sand and broken or crushed stone, &c., in the proportion of one part asphaltum to about five parts of the other ingredients, variously combined. If the asphaltum, when heated, proves of too dry a nature, and not sufficiently fluid to take up the proper amount of solid materials, there should be added to it a small portion of oil, coal-pitch, or any other substance that will readily mix with the asphaltum and make it of the proper fluidity.

The asphaltum is first reduced to a liquid by heat, when the other ingredients, also in a heated state, are added thereto. The whole mass is then well mingled and pressed. The more fluid the asphaltum is when heated the more of the solid materials is required to make the composition the required consistency. The less fluid the asphaltum the less of the solid materials is required. The stone is broken to the fineness of one-half inch diameter or less. These pieces of stone serve as binders in the composition, so that should a fracture be made in any part it would have to pass through all the stones lying in the plane of the fracture. Thus it is more difficult for a fracture to occur. Other solid materials that may serve the same purposes as the stone may be used in place of the stone. The sand is used simply to fill in the interstices between the larger pieces of stone, and other solid materials crushed to the fineness of sand may be used in place thereof. Where great strength is not required, sand or any other fine materials may take the place of the stone. The greatest strength is obtained where a binding material like broken stone is employed in the composition, as herein described. The asphaltum serves as the cementing ingredient between the pieces and particles of stone and sand, and just enough is required to make the mass of a plastic consistency when heated.

At certain of the joinings of the lengths of this conduit are placed septums manufactured of the same composition. These septums, Fig. 4, are molded so as to contain a large number of perforations arranged in some regular order, through which the wires are threaded. These perforations may be lined with glass; or any other good non-conducting material may be used. These septums are also molded so that a portion or section eighteen by twenty inches, or thereabout, Fig. 4, letter *c*, is vacant or wanting in the lowest part of each, so that when in position a man may pass through under the septums but within the conduit from length to length along the whole extent of the tube, for the purpose of inserting, adjusting, or inspecting the wires or making connections, and also for inspecting, &c., the different parts of the conduit.

The lengths and pieces of the shell or body of the conduit are welded or joined together with the same composition of which the shell itself of the conduit is made.

To insure uniformly solid work, it is necessary to heat the edges of the joints so that the material becomes yielding and manipulable at the moment the cementing or welding compound, heated to a plastic consistency, is poured or forced into the joint. The materials of the edges of the joints and the cementing compound are then hastily worked and welded into and with each other by proper hand implements, and the whole then held in even form until it becomes cold and firm.

Perforations $d\ d$ in the conduit and septums can easily be drilled at any desirable point for making connections, and the same closed up tight again with the same composition.

For large conduits, as represented in Plate II, where a very large number of wires are to be placed, the shape of the conduit would be elliptical by preference, and the plan of supporting and arranging the wires would be as follows: The septums would consist of steps $e\ e$, Fig. 6, which are made of the same composition, also of grooved standards or uprights $g\ g$, and rails $n\ n$, made of wood, coated or saturated with asphaltum.

The supporting-bars $h\ h$ may be made of glass, porcelain, gutta-percha, hard rubber, or any other good non-conducting material. The ends of the supporting-bars extend into the grooves of the standards or uprights, and are held firmly in place by pins, which pass through the lips of the grooves and the ends of the supporting-bars. A pin placed through each end of every fourth or fifth bar is sufficient. Semi-cylindrical notches $v\ v$ are to be made in the upper and lower surfaces of these supporting-bars, about one-half of an inch apart and at right angles to the length of the bar. The notches on each bar are so arranged that those of one side of the bar alternate with those of the opposite side; but when the bars are put in position the notches come together and form circular holes, through which the wires or cables pass. These supporting-bars may be three-eighths of an inch deep and one-half of an inch thick, and each one is a fac-simile of every other one in the same division. These supporting-bars may be made of wood saturated or coated with asphaltum, in which case the notches are to be, furthermore, gouged or indented at the middle of each one, so that a glass bead can be retained therein; or a short glass tube may be retained in the simple unindented notches. If wood be employed for the supporting-bars, the wires or cables will then pass through the glass beads or tubes, and by this means are prevented from coming in contact with the supporting-bars; or, if it be preferred, soft-rubber strips may be fastened to the upper and lower edges of the supporting-bars, so that when put in place the wires will be clasped between the rubber strips.

Beads or short tubes of glass or any other good non-conducting material, about three-eighths of an inch diameter, may be strung on each of the wires at intervals of about three feet. These tubes or beads can then be adjusted or moved along on the wires, one upon each, in conjunction, in couplets, triplets, or any multiplets, to any point where required, to keep the wires from touching each other, Fig. 10, letters $t\ t$. If a wire or the branch of a wire has to be led out between the other wires for making a connection, it can be inserted in a short glass tube lying across and upon the series of wires next below, Fig. 10, letters $x\ x$. The wires may be coated with any good non-conducting material, if desired. The designation of the wires by this plan is very simple. For explanation: The collection of wires in one frame may be designated by a numeral from one (1) to eight, (8,) and may be called a "division." In each division there may be placed from two hundred (200) to one thousand (1,000) or more wires. In a conduit measuring six and one-half feet the longest or vertical diameter, and five feet the shortest or horizontal diameter, there can be placed five thousand or more wires. On each supporting-bar are placed from ten to twenty-five or more wires. The wires on each supporting-bar are numbered from one up to twenty-five or more. The supporting-bars are lettered, the upper one in each division being lettered A, the second supporting-bar being lettered B, &c. We can say, for example, wire 1 B 15, which designates the fifteenth wire on supporting-bar B in the first division. In the lowest part of each division is a vacant space. If, at any time, it is necessary to get at any wire to replace or to readjust it, or to make a connection, the pins on the ends of all the bars below this wire can be withdrawn, so letting all the bars below this wire settle about three inches, the depth of the vacant space. This wire can then be got at handily, and when properly readjusted the bars may all be lifted to their places and fastened again with the pins. By this arrangement of the wires at the sides of the conduit, a sufficient space is left between the divisions for a man standing erect to pass through the length of the tube.

Vertical chambers are to be built up underneath the surface of the street or ground at different points along the line of the conduit, with man-holes and trap-doors at the surface for the purpose of entering the conduit.

Conduits so formed are impervious to water or gas, non-conductors of electricity, easily kept in repair, and especially adapted for the purposes as above set forth.

We claim—

1. The hollow conduit for housing telegraphic and telephonic wires, electric-light cables, and other electric conductors, manufactured in single complete lengths from the composition composed of native asphaltum, broken stone, and sand, substantially in the proportions and in the manner as herein shown and described.

2. The unitubular conduit for housing telegraphic and telephonic wires, electric-light cables, and other electric conductors, manufactured in two or more linear divisions or slabs from the composition composed of native asphaltum, broken stone, and sand, substantially in the proportions and in the manner as herein shown and described.

3. The method of uniting or welding the edges of the lengths and of the linear divisions of the lengths of hollow or tubular conduits for housing telephonic and electric conductors, manufactured from native asphaltum, broken stone, and sand, by softening the edges or making them plastic by heat just before the welding compound is poured within the joints, and establishing cohesion between the materials of the edges and cementing compound, substantially as herein shown and described.

4. The bead or short tube of glass or any other good non-conducting material inserted and retained between supporting-bars within the adjunct notches thereof, through which telegraphic and telephonic wires and electric-light cables are threaded, and by which they are isolated and insulated from the supporting-bars and from each other, in combination with the notched supporting-bars retaining the beads or short tubes, as shown and described.

5. The single complete lengths of hollow conduits for housing electric and telephonic wires, manufactured from native asphaltum, broken stone, and sand, and united or joined by establishing cohesion between the edges of the lengths and the cementing compound, substantially in the manner as herein shown and described.

6. The two or more linear divisions or slabs forming hollow or tubular conduits for housing electric and telephonic wires, manufactured from native asphaltum, broken stone, and sand, and united or joined by establishing cohesion between the edges of the sides and ends of the slabs and the cementing compound, substantially in the manner as herein shown and described.

7. The continuous and substantially seamless hollow or tubular conduit for housing electric and telephonic wires, manufactured from native asphaltum, broken stone, and sand, or their equivalents, in the manner as herein shown and described.

8. The combination, in an underground conduit for electric and telephonic wires, of the movable insulating-tube $x$, the line-wire passing loosely therethrough, and the wires supporting said tubes, substantially as shown and described.

IMLAH M. GREEN.
JOHN P. BIRCH.

Witnesses:
FRANK McBRIDE,
T. M. DEVINE.